United States Patent
Yamashita

[11] Patent Number: 5,995,766
[45] Date of Patent: Nov. 30, 1999

[54] FOCUS DETECTING DEVICE AND OPTICAL APPARATUS HAVING THE SAME

[75] Inventor: Kenichiro Yamashita, Matsudo, Japan

[73] Assignee: Canon Kabushiki Kaisha, Tokyo, Japan

[21] Appl. No.: 09/159,676

[22] Filed: Sep. 24, 1998

[30] Foreign Application Priority Data

Sep. 29, 1997 [JP] Japan .................................. 09-264200

[51] Int. Cl.⁶ ................................................. G03B 13/36
[52] U.S. Cl. ........................................... 396/97; 396/114
[58] Field of Search ...................... 396/97, 114

[56] References Cited

U.S. PATENT DOCUMENTS

| | | | |
|---|---|---|---|
| 4,772,912 | 9/1988 | Ishida et al. .............................. | 396/97 |
| 5,412,448 | 5/1995 | Kunishige .................................. | 396/97 |
| 5,771,413 | 6/1998 | Suda et al. ................................. | 396/114 |
| 5,839,001 | 11/1998 | Ohtaka et al. ............................ | 396/114 |
| 5,864,721 | 1/1999 | Suda et al. ................................. | 396/114 |
| 5,895,129 | 4/1999 | Ohta .......................................... | 396/97 X |

*Primary Examiner*—W. B. Perkey
*Attorney, Agent, or Firm*—Fitzpatrick, Cella, Harper & Scinto

[57] ABSTRACT

A focus detecting device which performs a temperature compensating action on the basis of an output of a temperature sensor includes a focus detecting sensor, a reimaging lens which reimages a light flux to be used for focus detection, a support member on which the focus detecting sensor and the reimaging lens are mounted, and the temperature sensor disposed in the vicinity of a mounting surface of the support member on which the reimaging lens is mounted.

12 Claims, 7 Drawing Sheets

FOCUS DETECTING DEVICE AND OPTICAL APPARATUS HAVING THE SAME

BACKGROUND OF THE INVENTION

1. Field of the Invention

The present invention relates to an improvement on a focus detecting device provided in an optical apparatus such as a camera.

2. Description of Related Art

Many of the single-lens reflex cameras of today are equipped with an automatic focusing device of the phase-difference detecting type using a line sensor. During recent years, the method of detecting a phase difference has variously been developed into a so-called area type automatic focusing method (hereinafter referred to as the area AF method) whereby focus detection is possible for any position within a two-dimensional focus detecting range.

FIG. 10 is a central sectional view of a mirror box of a camera, showing a focus detecting optical system designed for attaining the above-stated area AF method. In FIG. 10, reference numeral 101 denotes a lens mount. An objective lens (now shown) is mounted on the left side of the lens mount 101. A main mirror 103 is secured to a main-mirror receiving plate 114. That part of the main mirror 103 which is located on the optical axis 102 of the objective lens is formed as a semi-transparent area. A sub-mirror 104 is secured to a sub-mirror receiving plate 115 and is arranged on the optical axis 102 of the objective lens. Reference numeral 106 denotes a paraxial image forming plane, which is made conjugate to an image forming plane 105 by the sub-mirror 104.

Parts mounted on an AF body block 116, which is a base body of a focus detecting device, are next described as follows. A first AF mirror 107 which is a flat mirror is arranged to reflect a light flux coming from the sub-mirror 104. A mask member 108 is arranged to prevent the first AF mirror 107 from reflecting unnecessary rays of light. An infrared ray cutting filter 109 is arranged to remove such infrared rays that lower the accuracy of focus detection. A stop plate 110 is composed of a light-blocking thin plate which is made of a metal or resin and is provided with at least a pair of stop apertures formed therein. A reimaging lens block 111 includes at least a pair of lens parts corresponding to the stop apertures provided in the stop plate 110. A second AF mirror 112 is arranged to rectangularly reflect light fluxes coming from the reimaging lens block 111. An AF sensor 113 is a photoelectric conversion element having light receiving parts on which at least a pair of two-dimensional object images are projected by the reimaging lens block 111. An AF flexible circuit board 117 has the AF sensor 113 and its peripheral circuits (not shown) mounted thereon and is connected to a main circuit board (not shown). Further, a unit which is composed mainly of the above-stated AF body block 116 will be hereinafter simply called a focus detecting unit.

In a case where the area AF method is to be realized in accordance with the phase difference detecting method by the above-stated arrangement, however, the AF sensor tends to become too large in size, because the secondary object images which are projected in pair two-dimensionally spread. Therefore, to solve this problem, the above-stated optical system is arranged in a Z shape to make a ratio between the optical path length from the image forming plane 106 to the AF sensor 113 and the distance from the reimaging lens block 111 to the area sensor 113 as large as possible in such a way as to make the magnifying rate of reformed images on the AF sensor 113 as small as possible. By this arrangement, the AF sensor 113 can be arranged to be small enough for incorporation in the camera. Therefore, in order to keep the distance measuring accuracy of the focus detecting device of the above-stated area AF type at the same degree of accuracy as the conventional type focus detecting device, the AF sensor 113 must be arranged to be composed of minute pixels (picture elements). However, with the AF sensor 113 arranged to be composed of such minute pixels, focus detection would be greatly affected even a slight change in position of the secondary object images formed on the AF sensor 113.

One of inevitable factors of changes in position of the secondary object images is a change in distance between lenses caused by the thermal expansion of the reimaging lens block 111. Therefore, it has been developed and practiced to detect the temperature within the camera, particularly around the focus detecting unit by a temperature detecting means such as a temperature sensing IC or the like and to perform a temperature correcting action on the correlation of the secondary object images detected by the AF sensor 113.

However, since the temperature sensor which is the above-stated temperature detecting means sometimes has been used also for some purpose other than focus detection and thus has been disposed at a part other than the focus detecting unit. In such a case, it has been hardly possible to accurately make temperature correction as the temperature of the reimaging lens part of the focus detecting device differs from temperature measured by the temperature sensor. It has been also developed to have the temperature sensor disposed within the AF sensor. In that case, however, heat generation by the AF sensor itself tends to hinder accurate measurement of temperature of the reimaging lens part.

BRIEF SUMMARY OF THE INVENTION

In accordance with one aspect of the invention, there is provided a focus detecting device, which comprises a focus detecting sensor, a reimaging lens which reimages a light flux to be used for focus detection, a support member on which the focus detecting sensor and the reimaging lens are mounted, and a temperature sensor disposed in the vicinity of a mounting surface of the support member on which the reimaging lens is mounted, so that temperature compensation can be accurately performed.

The above and other aspects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
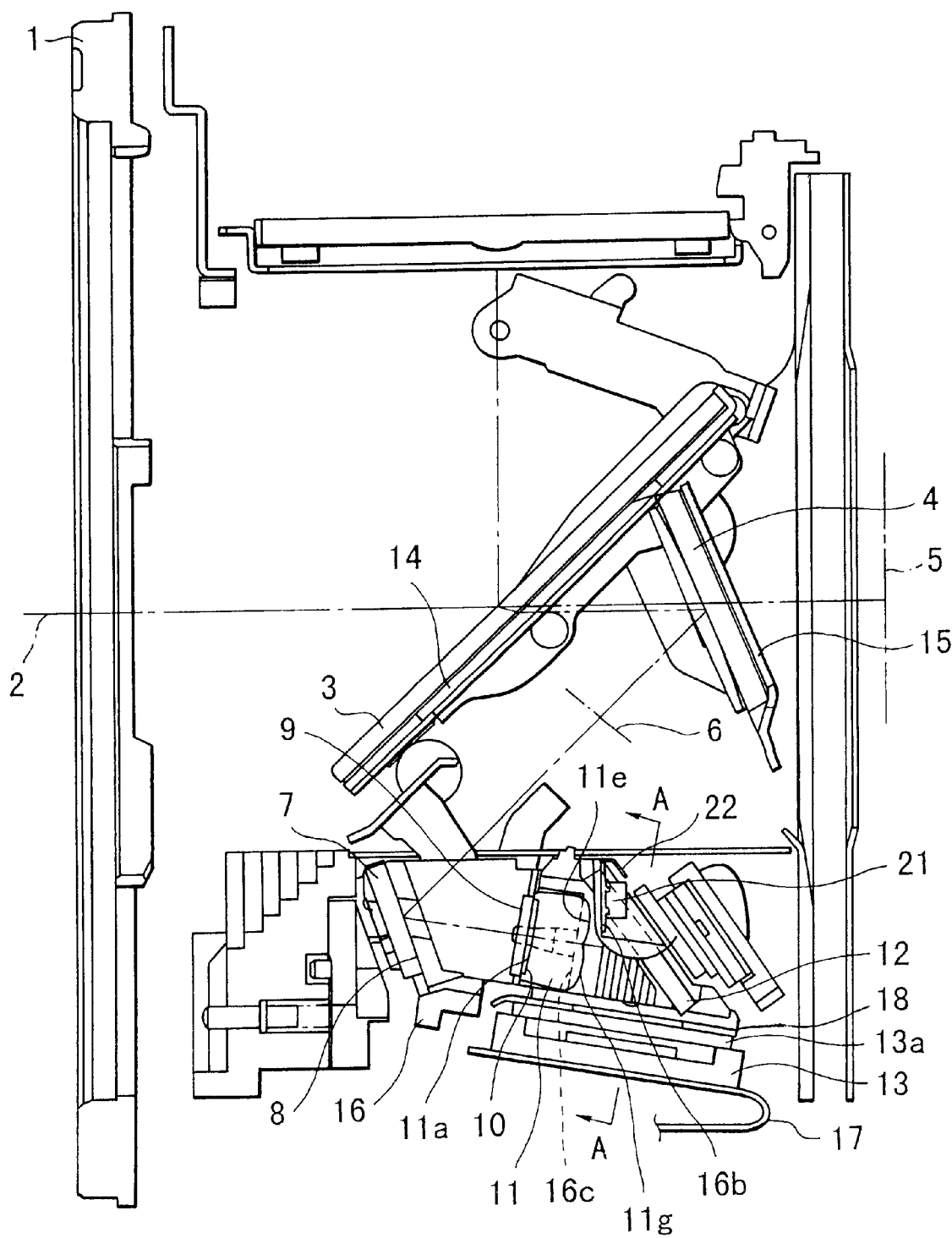
FIG. 1 is a central sectional view of a camera according to an embodiment of the invention.
Figure 2:
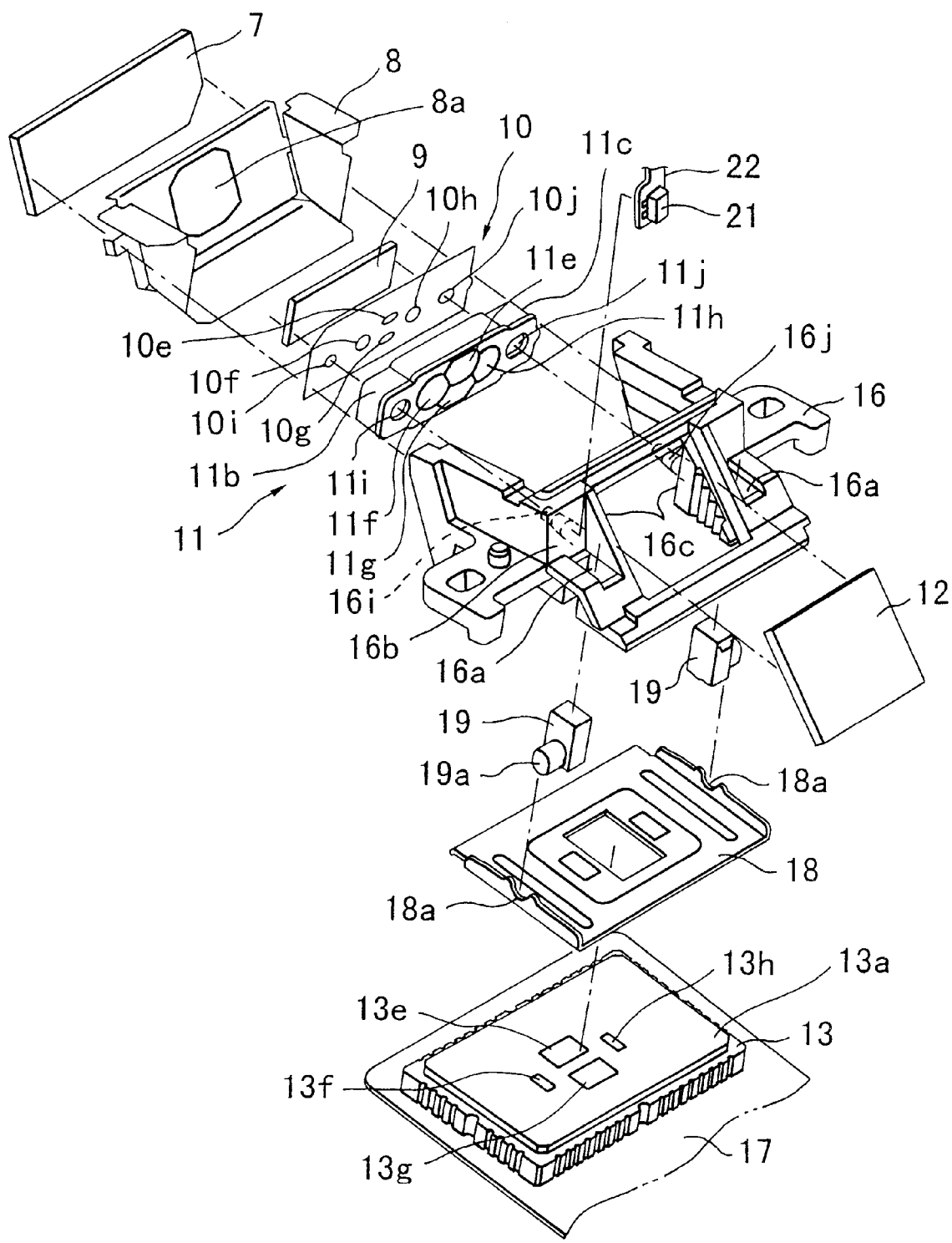
FIG. 2 is an exploded perspective view showing the arrangement of a focus detecting unit shown in FIG. 1.

FIG. 1 is a sectional view of a mirror box of a camera according to the embodiment of the invention, showing a focus detecting optical system designed for attaining the area AF method. FIG. 2 is an exploded perspective view showing the arrangement of a focus detecting unit composed of an AF body block 16 which is a base body of the focus detecting optical system shown in FIG. 1, a reimaging lens block, an AF sensor, etc.

Referring to FIG. 1, an objective lens (not shown) is mounted on the left side of a lens mount 1. A main mirror 3 is secured to a main-mirror receiving plate 14. That part of the main mirror 3 which is located on the optical axis 2 of the objective lens is formed as a semi-transparent area. A sub-mirror 4 is secured to a sub-mirror receiving plate 15 and is arranged on the optical axis 2 of the objective lens. Reference numeral 6 denotes a paraxial image forming plane which is made conjugate to an image forming plane 5 by the sub-mirror 4.

Parts mounted on an AF body block 16 which is a base body of the focus detecting device are next described as follows. A first AF mirror 7 which is a flat mirror is arranged to reflect a light flux coming from the sub-mirror 4. A mask member 8 is arranged to prevent unnecessary rays of light coming from the first AF mirror 7. An infrared ray cutting filter 9 is arranged to remove such infrared rays that lower the accuracy of focus detection. A stop plate 10 is composed of a light-blocking thin plate which is made of a metal or resin and is provided with two pairs of stop apertures 10e, 10g, 10f and 10h which are orthogonally intersecting each other.

A reimaging lens block 11 includes two pairs of lens parts 11e, 11g, 11f and 11h which correspond to the stop apertures 10e to 10h provided in the stop plate 10. A second AF mirror 12 is arranged to rectangularly reflect light fluxes coming from the reimaging lens block 11. An AF sensor 13 is a photoelectric conversion element having light receiving parts 13e, 13g, 13f and 13h on which two pairs of two-dimensional object images orthogonally intersecting each other are projected by the reimaging lens block 11. An AF flexible circuit board 17 has the AF sensor 13 and its peripheral circuits (not shown) mounted thereon. Further, a temperature sensor 21 is arranged to monitor the temperature of the reimaging lens block 11.

Figure 4:
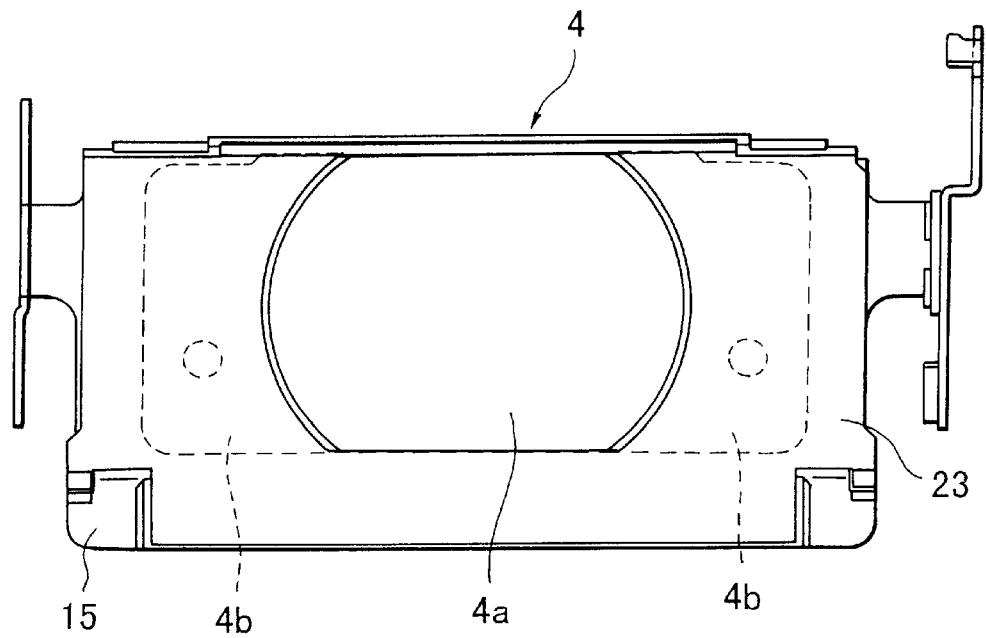
FIG. 4 is a plan view showing the arrangement of a sub-mirror receiving plate of the focus detecting unit shown in FIG. 2.

In the embodiment, as shown in FIG. 4, the sub-mirror 4 is composed of an elliptic reflection part 4a having a rotating elliptic surface and flange parts 4b which are provided for securing the sub-mirror 4 to the sub-mirror receiving plate 15. With the exception of the reflection part 4a, the sub-mirror 4 is covered with a sub-mirror mask 23 which has an antireflection coating applied thereto. The sub-mirror 4 is thus arranged to serve also as a field mask which limits a focus detecting area.

A single concave spherical surface 11a is formed on the light incidence side of the reimaging lens block 11, and, on the exit side of the reimaging lens block 11, there are integrally formed the two pairs of convex lens parts 11e to 11h in such a way as to be eccentric in opposite directions. The center of the concave spherical surface 11a is set on the paraxial image forming plane 6 of the objective lens. The centers of the two pairs of lens parts 11e to 11h are set approximately equally in the neighborhood of the stop apertures of the stop plate 10. Further, flange parts 11b and 11c are integrally formed on both sides of the lens parts 11e to 11h. Mounting holes 11i and 11j are formed respectively in the flange parts 11b and 11c of the reimaging lens block 11.

The stop plate 10 is also provided with mounting holes 10i and 10j which are similar to the mounting holes 11i and 11j of the reimaging lens block 11. The stop plate 10 and the reimaging lens block 11 are thus fitted together on shafts 16i and 16j which protrude from the reimaging-lens-block mounting surface 16c of the AF body block 16. Then, the stop plate 10 and the reimaging lens block 11 are cemented and secured to the AF body block 16 together with the infrared ray cutting filter 9.

Adjusters 19 which are slidable vertically as viewed in FIG. 2 are fitted in two hole parts 16a of the AF body block 16. Arcuate sliding parts 18a of an AF-sensor holding member 18 which is made of a metal plate are arranged to abut on the hinge parts 19a of the adjusters 19. A cover glass part 13a which is applied on the light receiving side of the AF sensor 13 is in contact with the lower surface of the AF-sensor holding member 18.

The adjusters 19 and the AF-sensor holding member 18 constitute a mechanism arranged to adjust the inclination and position of the AF sensor 13 with respect to three axes which include the optical axis and orthogonally intersect each other. The adjusting mechanism is provided for the purpose of having the light receiving surface of the AF sensor 13 in an apposite position against any deviation of the optical axis resulting from errors in respect of the precision and the assembly of parts forming the focus detecting device. The AF sensor 13 is fixed in an adjusted position by applying an adhesive around the hinge parts 19a of the two left and right adjusters 19, the two hole parts 16a of the AF body block 16, the AF-sensor holding member 18 and the AF sensor 13. For this purpose, a UV adhesive (ultraviolet-curable adhesive) is mainly used.

Figure 3:
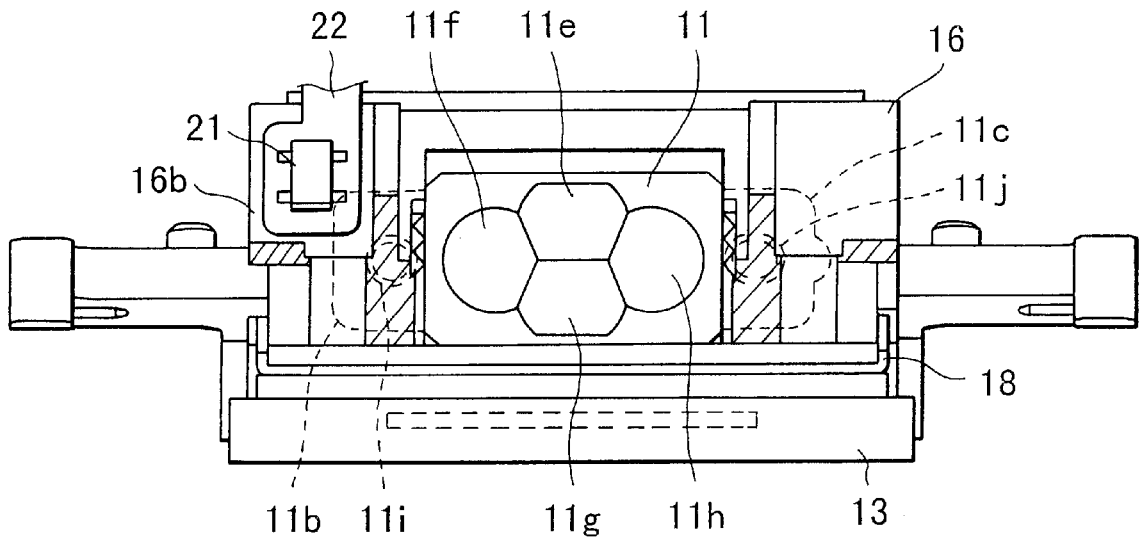
FIG. 3 is a sectional view of the focus detecting unit shown in FIG. 2.

A C-MOS temperature sensor IC or the like is employed as the temperature sensor 21. The temperature sensor 21 is stuck with a double-sided adhesive tape to the wall part 16b of the AF body block 16 in a state of being soldered to a temperature-sensor flexible circuit board 22 which is connected to the AF flexible circuit board 17 at a part which is not shown. FIG. 3 shows the AF body block 16 as viewed from a section taken along a line A—A indicated in FIG. 1. As apparent from FIGS. 1 and 3, the temperature sensor 21 is mounted on the AF body block 16 at a part where the temperature sensor 21 is approximately opposed to the flange part 11b of the reimaging lens block 11 across the wall part 16b of the AF body block 16. In other words, the temperature sensor 21 is mounted on the reverse side of the reimaging-lens-block mounting surface 16c of the AF body block 16.

Further, a space on the side of the wall part 16b on which the temperature sensor 21 is mounted is, so to say, a dead space on the AF body block 16 surrounded with the flange part 11b of the reimaging lens block 11, an area through which an effective light flux passes from the lens part of the reimaging lens block 11 to the AF sensor 13 via the second AF mirror 12 and the AF sensor 13.

The optical arrangement of the focus detecting device in the embodiment is next described below.

Two focal points which define the elliptic shape of the reflection part 4a of the sub-mirror 4 are located respectively on a line obtained by reversely extending, toward the objective lens, an optical path of a ray of light on the optical axis 2 of the objective lens after the ray of light is refracted by the main mirror 3 and on another line obtained by extending an optical path after the ray of light is reflected by the sub-mirror 4. In this case, one of the focal points is set at a point which is optically equivalent to the representative exit pupil position of the objective lens. The other focal point is set at a point optically equivalent to the stop plate 10. The reflection part 4a of the sub-mirror 4 is thus arranged to function as a field lens. The above-stated representative exit pupil position means a virtual pupil position which is peculiar to the focus detecting system and which is decided from an overall viewpoint considering the exit window conditions of objective lenses of varied kinds expected to be mounted on the camera.

The lens parts of the reimaging lens block 11 are arranged to act in conjunction with corresponding apertures of the stop plate 10. Light fluxes passing through the stop apertures 10e to 10h respectively form secondary object images, through the second AF mirror 12, on the light receiving parts 13e to 13h of the AF sensor 13 corresponding to the stop apertures 10e to 10h. A detection system using the light fluxes passing through the elements indicated by reference numerals having suffixes "e" and "g" is arranged to divide the exit pupil of the objective lens in the vertical direction. Another detection system using the light fluxes passing through the elements indicated by reference numerals having suffixes "f" and "h" is arranged to divide the exit pupil of the objective lens in the horizontal direction. The detection system which divides the pupil in the vertical direction is called a first focus detecting system. The detection system which divides the pupil in the horizontal direction is called a second focus detecting system.

Figure 5:
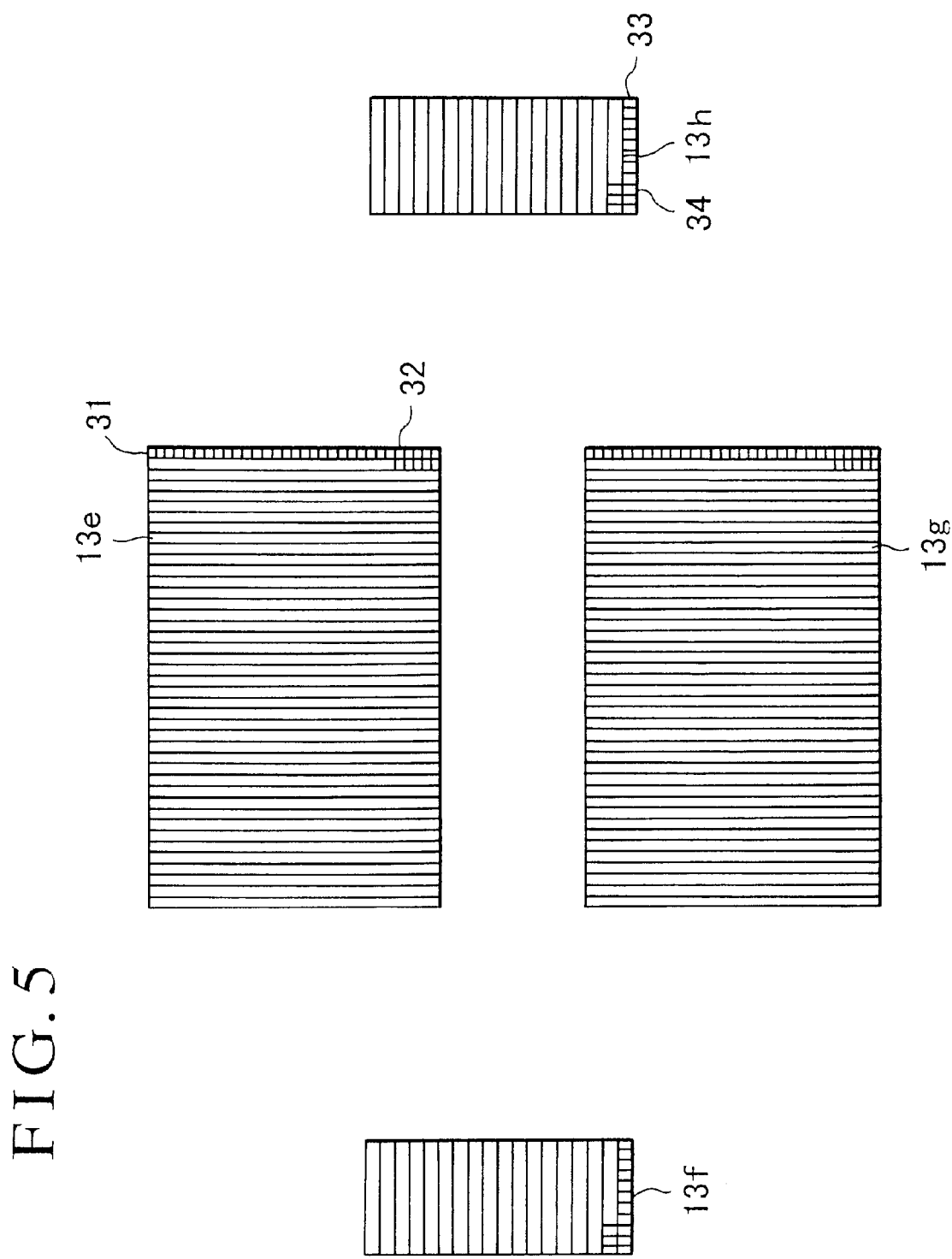
FIG. 5 shows in an enlarged state the light receiving parts of an AF sensor shown in FIG. 2.

FIG. 5 is an enlarged view of the light receiving parts 13e to 13h arranged on the AF sensor 13. Each light receiving part is composed of sensor arrays 31 or 33 which are two-dimensionally arrayed and each of which is composed of pixels 32 or 34 arranged in the above-stated pupil dividing direction. Further, each sensor array 31 or 33 is suitably divided in its longitudinal direction, and there are a plurality of focus detecting points on one and the same sensor array in the longitudinal direction, for example, in the case of the first focus detecting system.

In short, the area AF method of the focus detecting device in the embodiment is attained by two-dimensionally enlarging the arrangement of the conventional phase-difference-detecting type focus detecting method using a pair of line sensors. The focus position of the objective lens is detected by detecting a relation between the relative positions of images formed on a pair of sensor arrays which are arbitrarily selected for detection.

Any light flux that passes the elements indicated by reference numerals having different suffixes never reaches a predetermined position and, therefore, does not contribute to focus detection. A spacing distance between the stop apertures 10e and 10g differs from a spacing distance between the stop apertures 10f and 10h. In the second focus detecting system which has a wider spacing distance and which is composed of elements indicated with reference numerals having suffixes "f" and "h" is more sensitive to the displacement of two-dimensional images and permits focus detection at a higher degree of precision than the first focus detecting system. The first focus detecting system which has a narrower spacing distance permits focus detection for an area defined by the size of the reflection part 4a of the sub-mirror 4. In the second focus detecting system having a wider spacing distance, on the other hand, an area through which rays of light can be passed is limited by the aperture part 8a of the mask member 8 on the first AF mirror 7, the size of the above-stated representative pupil, etc. Therefore, the focus detecting range of the second focus detecting system differs from that of the first focus detecting system.

In the case of the embodiment, a Z-type optical system including the sub-mirror 4 which has a rotating elliptic surface is used for the focus detecting device for the following reason. The magnifying rate of reimaging on the AF sensor 13 is minimized by setting a distance from the paraxial image forming plane 6 to the AF sensor 13 and a distance from the reimaging lens block 11 to the AF sensor 13 to have a large ratio between these distances, so that the AF sensor 13 can be compactly arranged inside of the camera body without difficulty. Hence, in the focus detecting device in the embodiment, the AF sensor 13 has much smaller pixels than the conventional focus detecting device. Therefore, focus detection will be greatly affected even by a small change in the position of the secondary object image on the AF sensor 13.

Inevitable factors of changes in position of the secondary object images include a change of a distance between lenses due to thermal expansion of the reimaging lens bock 11. In view of this, it is necessary to accurately monitor the temperature of the reimaging lens block 11 and to make so-called temperature compensation by correcting a correlation between secondary object images detected by the AF sensor 13 for the change of distance between the lenses. The method for this temperature compensation is well known, for example, from Japanese Patent Publication No. HEI 8-33511, etc. The details of that method are, therefore, omitted here. The reason why the temperature sensor 21 in the embodiment is disposed in the above-stated position is as follows.

The AF sensor 13 for the area AF method in the embodiment has many sensor arrays as mentioned above. Therefore, the circuit scale of the AF sensor 13 is considerably greater than that of the conventional arrangement of using only several pairs of line sensors. Further, the operating speed of the AF sensor 13 must be higher than that of the conventional arrangement. Therefore, heat generation by the AF sensor 13 produces a greater adverse effect of temperature over the reimaging lens block 11 than the operating environment of the camera.

Figure 6:
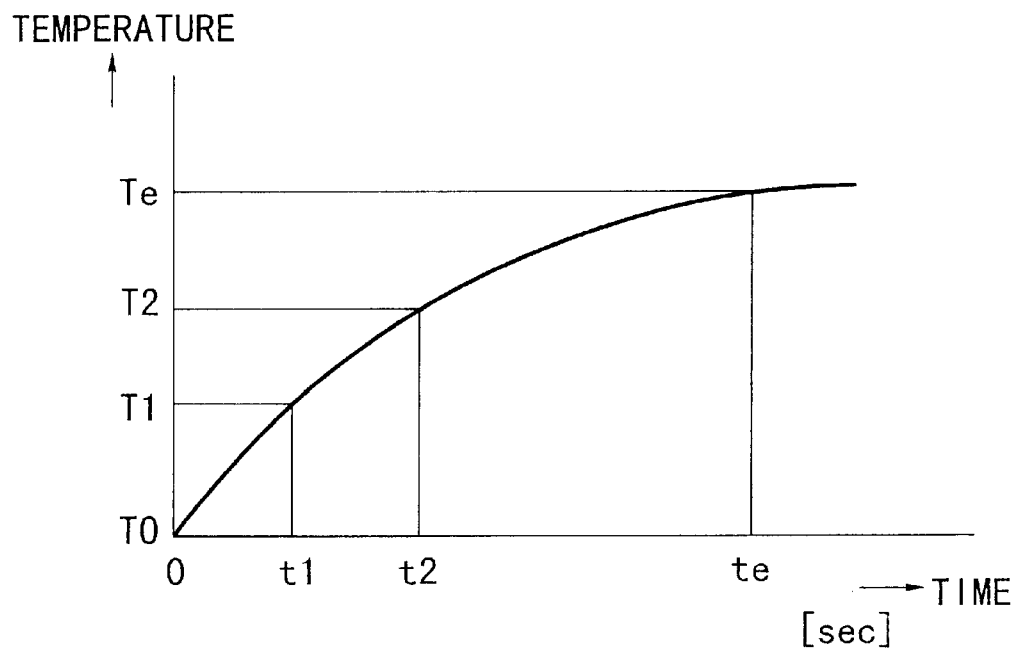
FIG. 6 is a graph showing temperature variations taking place at a reimaging lens block in relation to time base.

FIG. 6 is a graph showing results of tests indicating variations of the temperature of the reimaging lens block 11 taking place after a start of operation of the AF sensor 13. In FIG. 6, the abscissa axis indicates time while the ordinate axis indicates the temperature of the reimaging lens block 11.

Figure 7:
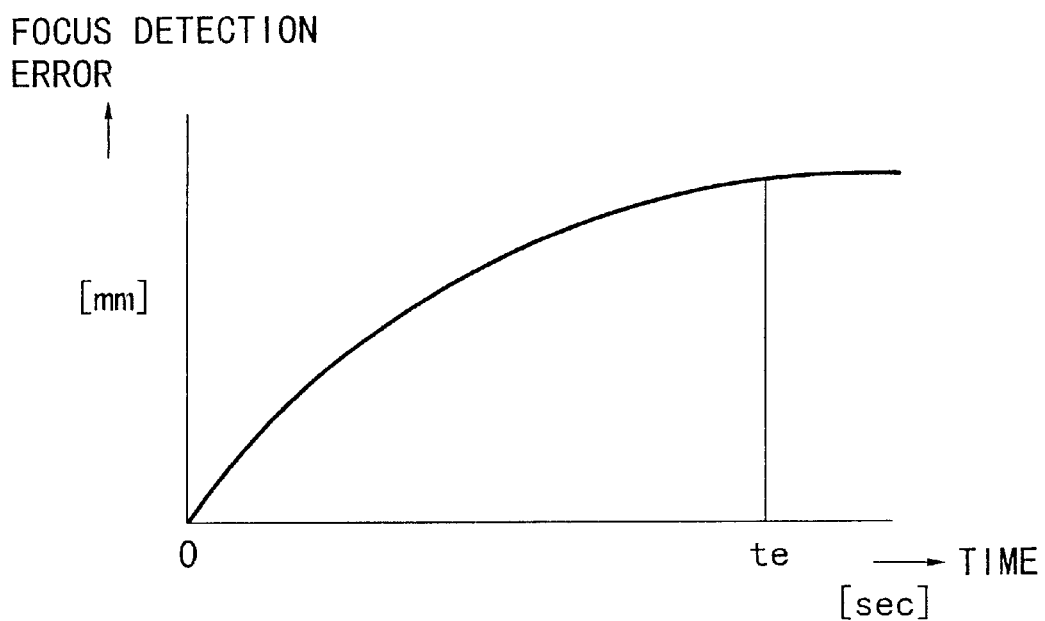
FIG. 7 is a graph showing variations of a focus detection error in relation to time base.

FIG. 7 is a graph showing results of tests indicating variations of focus detection error obtained without making any temperature compensation from the start of operation of the AF sensor 13. In FIG. 7, the abscissa axis indicates time while the ordinate axis indicates the amount of focus detection error (amount of defocus).

As apparent from FIGS. 6 and 7, the temperature variations of the reimaging lens block 11 and the focus detection error similarly vary with time. Therefore, it is evident that an arrangement for detecting the temperature of the reimaging lens block 11 makes the focus detection error correctable.

It has been known that a period "te" required before stabilization of temperature of the reimaging lens block 11 is 20 minutes or thereabout, although it depends also on the ambient temperature. The temperature of the reimaging lens block 11 thus remains in a transient state until the temperature "te" is reached while the camera is actually in operation. It is, therefore, necessary to monitor in real time and with accuracy the temperature of the reimaging lens block 11.

Figure 8:
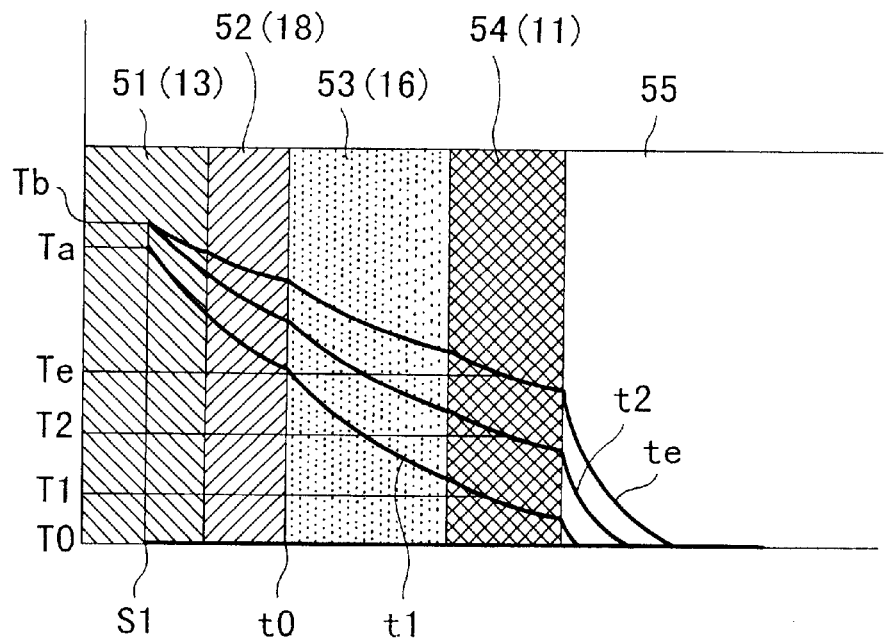
FIG. 8 is a model illustration showing heat conduction taking place within the focus detecting unit.

FIG. 8 is a model illustration showing a heat conducting state obtained around the AF body block 16. In FIG. 8, the abscissa axis indicates the approximate distance of the heat conduction and the ordinate axis indicates the temperature. In the model illustration of FIG. 8, a block 51 corresponds to the AF sensor 13, a block 52 corresponds to the AF-sensor holding member 18, a block 53 corresponds to the AF body block 16, a block 54 corresponds to the reimaging lens bock 11, and a block 55 corresponds to air existing around the reimaging lens block 11. Incidentally, since the heat conductivity of air is much lower than those of other parts which are solid parts, the head conduction by air from the AF sensor 13 to the reimaging lens block 11 is ignored here. Four temperature gradient lines indicated by thick lines correspond respectively to the time points "t0", "t1", "t2" and "te" shown in FIG. 6. Reference symbol T0 denotes an ambient temperature obtained when the AF sensor 13 is not in operation.

The temperature of the AF sensor 13 itself rapidly increases from the level T0 to a level Ta and then comes to stabilize at a level Tb. The heat generated at a point S1 within the AF sensor 13 (the block 51) is gradually conducted to the reimaging lens block 11 (the block 54) according to the heat conductivity of each of the members. Therefore, the rise of temperature in respect of the time base of the reimaging lens block 11 becomes as shown in FIG. 6 and eventually, at the time point "te", comes into a balanced state at the temperature level Te between the temperature Tb of the AF sensor 13 and the ambient temperature T0.

Considering also the heat conductivity of each member, it is extremely difficult to accurately detect the temperature variations of the reimaging lens block 11 in the transient state from any position located away from the reimaging lens block 11.

Figure 9:
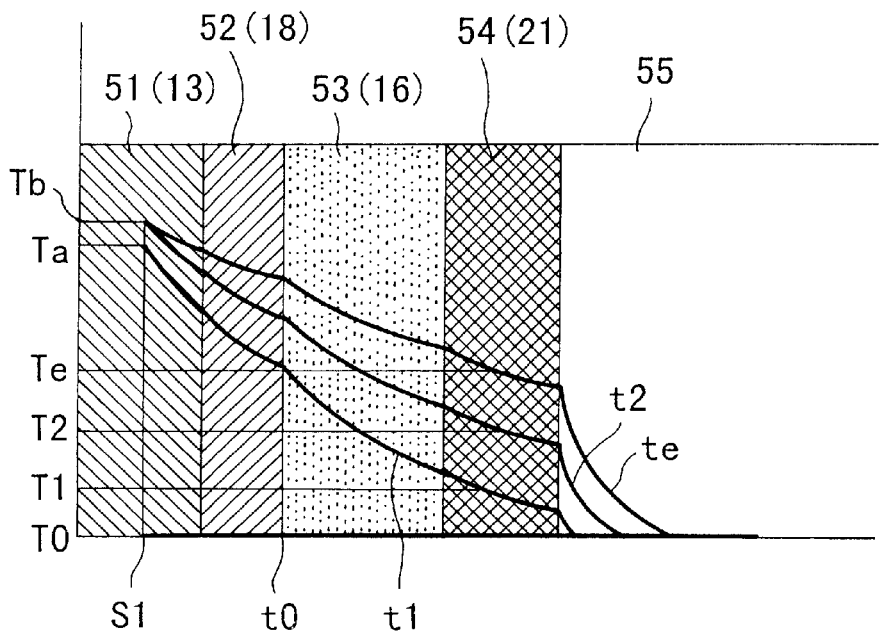
FIG. 9 is a model illustration showing heat conduction obtained by making the disposition of a temperature sensor in the embodiment correspond to the arrangement shown in FIG. 8.
Figure 10:
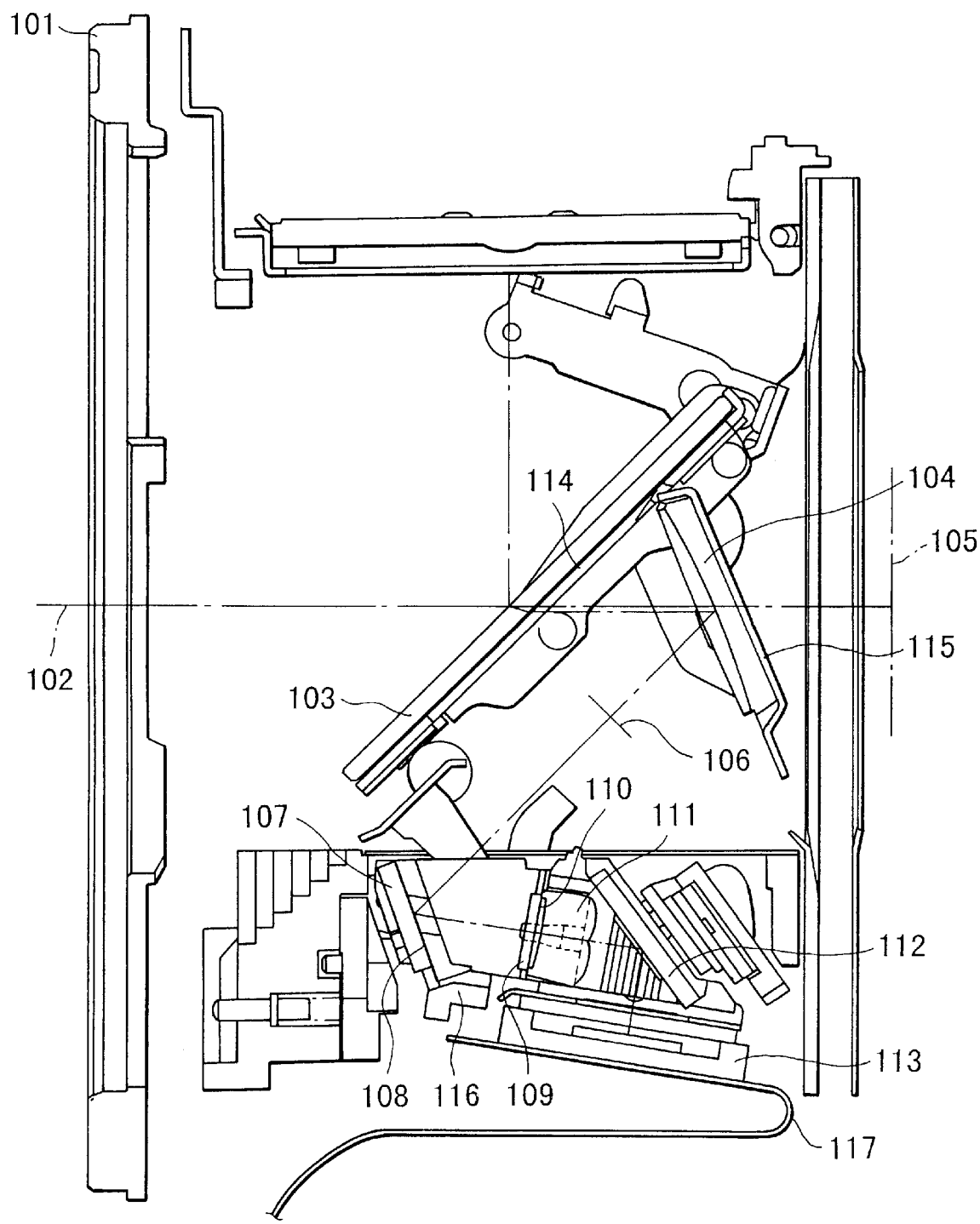
FIG. 10 is a central sectional view of a camera showing by way of example the arrangement of a conventional focus detecting optical system.

In view of the difficulty, the temperature sensor 21 in the embodiment is attached to the reverse-side wall 16b of the mounting surface 16c of the AF body block 16 on which the reimaging lens block 11 is mounted. With the temperature sensor 21 arranged in this position, the reimaging lens block 11 as represented by the block 54 in FIG. 8 can be replaced with the temperature sensor 21 as represented by the block 54 in FIG. 9. Therefore, the temperature of the reimaging lens block 11 can be detected in a state equivalent to a state of having the temperature sensor 21 exactly in the same position as the reimaging lens block 11.

Further, although the temperature-sensor flexible circuit board 22 and, in some case, a double-sided adhesive tape are interposed in between the temperature sensor 21 and the AF body block 16, they produce no adverse effect to any tangible degree so long as they do not have any excessively thickness. As regards the method for securing the temperature sensor 21 in position, the temperature sensor 13 may be cemented directly to the AF body block 16.

The invention is not limited to the area AF type focus detecting device described in the foregoing, but is applicable also to a focus detecting device of the conventional type having several focus detecting points (several distance measuring points).

I claim:

1. A focus detecting device which performs a temperature compensating action on the basis of an output of a temperature sensor, said focus detecting device comprising:

a) a focus detecting sensor;

b) a reimaging lens which reimages a light flux to be used for focus detection;

c) a support member on which said focus detecting sensor and said reimaging lens are mounted; and d) said temperature sensor disposed in the vicinity of a mounting surface of said support member on which said reimaging lens is mounted.

2. A focus detecting device according to claim 1, wherein said temperature sensor is disposed on a reverse side of said mounting surface of said support member.

3. A focus detecting device according to claim 1, wherein said mounting surface of said support member is provided with shafts, said shaft being fitted into holes formed in said reimaging lens.

4. A focus detecting device according to claim 1, wherein said focus detecting sensor is mounted on said support member through a position adjusting mechanism.

5. A focus detecting device according to claim 1, further comprising a mirror which reflects a light flux having passed through said reimaging lens to lead the light flux to said focus detecting sensor, said mirror being mounted on said support member.

6. A focus detecting device according to claim 1, further comprising a stop member for limiting a light flux incident on said reimaging lens, said stop member being mounted on said support member.

7. An optical apparatus having a focus detecting device which performs a temperature compensating action on the basis of an output of a temperature sensor, said optical apparatus comprising:

a) a focus detecting sensor;

b) a reimaging lens which reimages a light flux to be used for focus detection;

c) a support member on which said focus detecting sensor and said reimaging lens are mounted; and d) said temperature sensor disposed in the vicinity of a mounting surface of said support member on which said reimaging lens is mounted.

8. An optical apparatus according to claim 7, wherein said temperature sensor is disposed on a reverse side of said mounting surface of said support member.

9. An optical apparatus according to claim 7, wherein said mounting surface of said support member is provided with shafts, said shaft being fitted into holes formed in said reimaging lens.

10. An optical apparatus according to claim 7, wherein said focus detecting sensor is mounted on said support member through a position adjusting mechanism.

11. An optical apparatus according to claim 7, further comprising a mirror which reflects a light flux having passed through said reimaging lens to lead the light flux to said focus detecting sensor, said mirror being mounted on said support member.

12. An optical apparatus according to claim 7, further comprising a stop member for limiting a light flux incident on said reimaging lens, said stop member being mounted on said support member.

* * * * *

UNITED STATES PATENT AND TRADEMARK OFFICE
CERTIFICATE OF CORRECTION

PATENT NO. : 5,995,766
DATED : November 30, 1999
INVENTOR(S) : Kenichiro Yamashita It is certified that error appears in the above-identified patent and that said Letters Patent is hereby corrected as shown below:

Column 2,
Line 10, "affected" should read -- affected by --.
Line 13, "of" (first occurrence) should read -- of the --.
Line 31, "been also" should read -- also been --.

Column 4:
Line 40, "in respect of" should read -- with respect to --.

Column 6:
Line 1, "In the " should read -- The --.

Column 7:
Line 20, "bock" should read -- black --.
Line 36, "in respect of" should read -- with respect to --.
Line 58, "case," should read -- cases, --.
Line 61, "excessively" should read -- excessive --.

Column 8:
Line 21, "shaft" should read -- shafts --.
Line 51, "shaft" should read -- shafts --.

Signed and Sealed this

Twenty-fifth Day of September, 2001

Attest:

NICHOLAS P. GODICI
Attesting Officer    Acting Director of the United States Patent and Trademark Office